Aug. 25, 1953 J. I. PANTCHECHNIKOFF 2,650,258

SEMICONDUCTOR PHOTOSENSITIVE DEVICE

Filed June 12, 1951

INVENTOR

JACQUES I. PANTCHECHNIKOFF

BY Morris A. Rabkin

ATTORNEY

Patented Aug. 25, 1953 2,650,258

UNITED STATES PATENT OFFICE 2,650,258

SEMICONDUCTOR PHOTOSENSITIVE DEVICE

Jacques I. Pantchechnikoff, Princeton, N. J., assignor to Radio Corporation of America, a corporation of Delaware Application June 12, 1951, Serial No. 231,195

14 Claims. (Cl. 136—89)

This invention relates to improvements in photosensitive devices which include a body of a semi-conducting material having a light-transmitting film of a metal on one surface. This type of device also includes a pair of electrodes, one of which is in contact with the metal film and the other of which makes large-area contact with another surface of the semi-conductor body. When light impinges upon the metal film of a device of this type, a photo-effect occurs. When the thin metal film is constituted of certain metals, such as gold, copper, or nickel, a photovoltaic effect is produced.

More particularly, the present invention relates to improvements in electrode structure and mounting means in a device of the general type described above.

One object of the present invention is to provide an improved photosensitive device including a body of semi-conducting material and a light-transmitting metal film on a surface of the semi-conductor.

Another object of the invention is to provide an improved mounting means for a semi-conductor photosensitive device.

Another object of the invention is to provide an improved electrode arrangement in a photo device of the type including a body of semi-conducting material having a thin light-transmitting surface film of a metal.

Still another object of the invention is to provide, in a device of the type including a body of semi-conducting material and a light-transmitting film of metal on a surface of the body, an improved type of electrode contacting the film.

Figure 1:
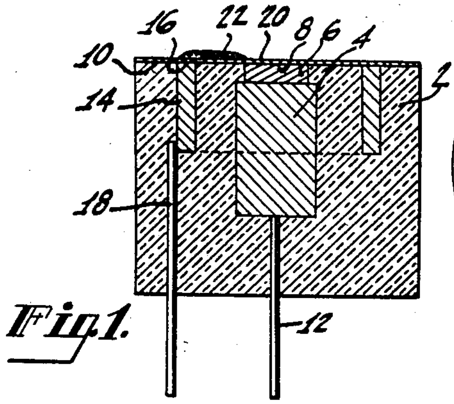
Figure 2:
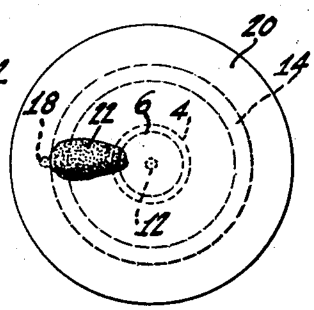
Figure 3:
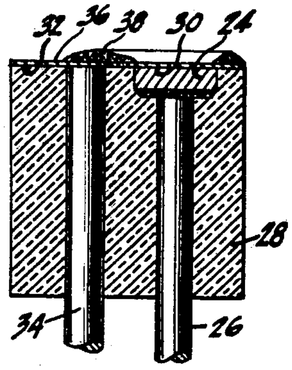
Figure 5:
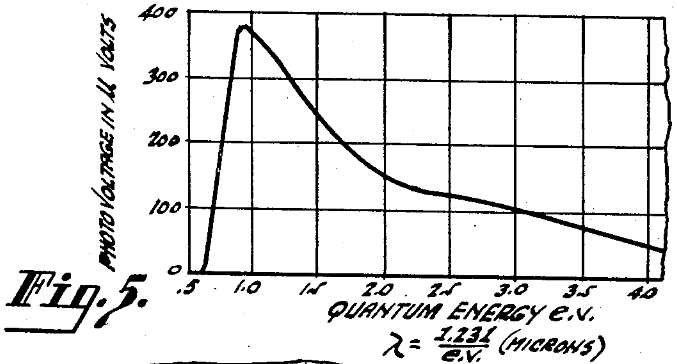
Figure 4:
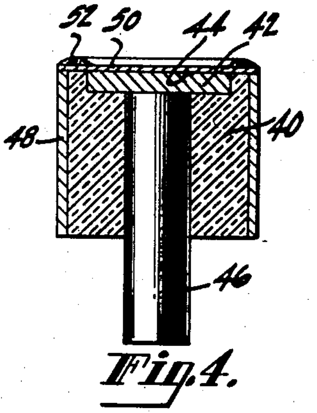
Figure 6:
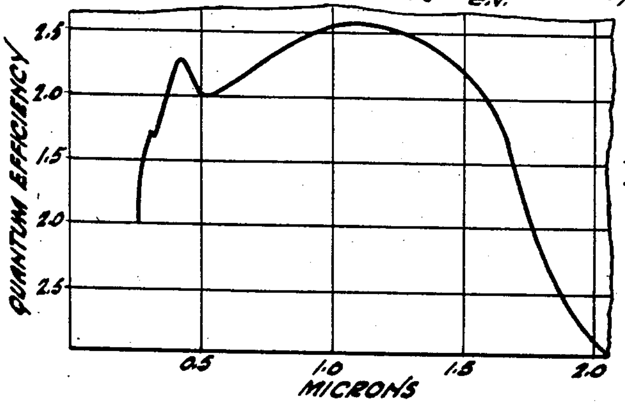
Figure 7:
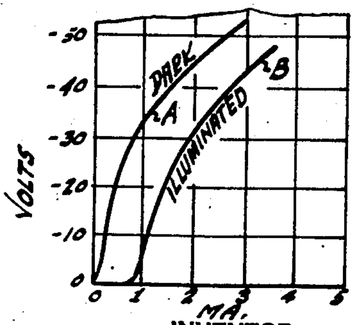

These and other objects will be more apparent and the invention will be more readily understood from the detail description which follows and from the accompanying drawing, of which:

Fig. 1 is an elevation, cross-section view of one embodiment of a device made in accordance with the present invention, Fig. 2 is a top plan view of the device of Fig. 1, Fig. 3 is an elevation view, partly in cross-section, of a second modification of the device of the present invention, Fig. 4 is a view similar to that of Fig. 1 or 3 of a third embodiment of a device constructed in accordance with the present invention, Fig. 5 is a spectral response curve of a device made in accordance with the present invention, Fig. 6 is a spectral response curve showing quantum efficiency of utilization of light over a band of the spectrum including the visible and infra-red portions for a typical device of the present invention, and Fig. 7 is a pair of curves illustrating the current-voltage characteristics, using 60 cycle A.-C., in the dark state and in the illuminated state of a photo device of the present invention.

In general, the present invention encompasses an electrical device comprising a body of semi-conducting material including an exposed surface, a lead spaced from the surface, a light-transmitting film of metal upon the exposed surface, an electrically insulating support in which at least the body is embedded, and a layer of low-resistance, electrically conducting material forming a conductive path between the lead and the film.

A specific embodiment of the invention will now be described with reference to Figs. 1 and 2. One form of the device comprises a block of insulating material 2, which is preferably polystyrene, or a methacrylate resin but which may be any other good insulator such as any other synthetic resin, gilsonite, or cellulosic casting materials. Embedded in the center of the insulator block is a nickel stud 4 to an end of which is soldered a small body 6 of semi-conducting material. The semi-conducting material is preferably highly purified germanium having less than 1% residual impurities. The germanium may be either of so-called "N" type or "P" type. The body of semi-conducting material is disposed such that one of its surfaces 8 is exposed to the air at a surface 10 of the block of insulating material. This exposed surface is ground and etched in conventional manner such as in the manufacture of germanium rectifiers or transistors. A wire lead 12 is soldered to the opposite end of the stud, the end of the lead projecting from the block of insulating material so that the device may be connected into a utilization circuit.

Also embedded in the block of insulating material is another lead 14 which may be a cylinder of stainless steel or other metal. This cylindrical lead surrounds and is concentric with the stud 4 and germanium body 6. One end of the metal cylinder has a face 16 which is exposed at the same surface of the insulator block at which the surface of the germanium body is exposed. A wire connecting lead 18 may be soldered to the cylindrical lead 14, the wire projecting from the block of insulating material.

The exposed surface 8 of the semi-conductor is provided with a thin film 20 of metal such as gold, copper, or nickel. This metal film should be thin enough to transmit about 30 to 40% of light which is directed upon it. On the other hand, the film should be of relatively low resistance. Resistivity of about 500 ohms/cm.$^2$ has been found satisfactory. The metal film may be deposited upon the entire surface 10 of the in-techniques. Although not necessary to the operation of the device, the metal film 20 may be deposited by well known vacuum evaporating sulator block, in which case it also covers the exposed face 16 of the cylindrical lead 14.

In this type of device, there is a barrier layer at the etched surface of the semi-conductor which is in contact with the metal film. Because of this barrier layer, a potential gradient exists at the metal-semiconductor interface.

A particular feature of the present invention is the use of an improved "pressureless" electrode to make electrical contact with the metal film. This contact electrode may comprise a spot of metal 22 formed from a thin layer of metal paste. Silver paste, which dries by evaporation of volatile solvents, has been found satisfactory. A colloidal suspension of any other conducting material may be substituted for the silver paste so long as a layer of conducting material, having the characteristic of relatively low resistance, is produced. The layer of metal paste may be deposited on a limited area between an edge of the body of semi-conductor 6 and the end 16 of the metal cylinder to provide a low resistance path. Although the metal paste has a resistivity about the same as that of the light-transmitting metal film, the film cannot easily be made to form a continuous unbroken conducting path when deposited on the face of the insulator block. Small irregularities in the face of the block break up the thin film. If the metal film is made heavy enough to be continuous, it is not sufficiently light transmitting.

When the metal film directly over the semi-conductor body is illuminated with visible or infra-red rays, a photo-E. M. F. is established. Fig. 5 is a spectral response curve showing how photovoltage, in microvolts, varies with wavelength of the incident light. As shown by the curve, the spectral response of a typical unit rises sharply at 1.9 microns (corresponding to a threshold energy of 0.65 e. v.), reaches a peak at 1.5 microns (0.8 e. v.), and then decreases to 50% of peak at 0.7 micron (1.76 e. v.).

Fig. 6 is a curve of quantum efficiency of a typical device of the present invention, measurements being made with a monochromator, for wavelengths throughout the visible spectrum and infra-red. The curve shows that the maximum quantum yield is about 2.5 electrons per quantum.

Fig. 7 is a graph showing current-voltage characteristics in the dark and in the illuminated state of a cell of the present invention, the characteristics being taken in the back, or high resistance direction. In this figure, curve A is for the dark condition and curve B is for the illuminated condition. It will be noted that, although current flow is greatest when the cell is illuminated, both curves have the same form and that the curve for the illuminated state in the back direction can be derived from the dark characteristic curve by a uniform translation at constant voltage.

It is possible to vary the specific form of the various parts of the present device without departing from the spirit of the invention. In Fig. 3, there is shown a second embodiment of apparatus. This embodiment comprises a thin wafer 24 of germanium semi-conducting material soldered to the end of a nickel stud 26. The wafer and part of the stud are embedded in a block of polystyrene 28, one face 30 of the wafer being exposed at a face 32 of the polystyrene block.

Embedded in the insulator block and spaced from the body of semi-conducting material is a metal lead 34. This may be another metal stud similar to the stud 26. Covering the entire face 32 of the plastic block, including the exposed surface 30 of the semi-conductor and an end of the lead 34, is a light-transmitting film of metal 36. A ring 38 of silver paste is disposed on the metal film covering the area around the outer edge of the germanium wafer and overlapping the exposed end of the lead 34.

The modification of the present invention shown in Fig. 4 includes a block 40 of synthetic resin and a wafer 42 of germanium semi-conducting material embedded in the block of insulating material such that an etched surface 44 is exposed at the face of the block. The wafer is soldered to a metal stud 46 which is also partly embedded in the insulator. In this form of the device, the other electrical lead is a metal cylinder 48, which may be of stainless steel. The cylinder forms a retaining shell for the material of the mounting block. A thin, light-transmitting film of metal 50 is disposed over the etched surface of the semi-conductor and an end of the cylindrical lead. A ring of metal paste 52 is deposited on the thin film in order to form a good conducting path between the part of the thin film in contact with the semi-conductor and the lead 48.

It will be understood that the present invention is intended only as an improvement in the electrode arrangement of a device of the type described. Semi-conductors other than germanium may be used.

The use of the improved electrode arrangements of the present invention results in greatly increased stability of operation, regardless of humidity conditions, compared with that of devices of this class previously proposed. Since the improved device is also completely insensitive to mechanical vibrations, its range of usefulness is greatly extended.

Another advantage of the device of the present invention is that it responds to light signals of considerably higher alternating frequency than devices of the same general type previously proposed.

I claim:

1. An electrical device comprising a body of semi-conducting germanium including an exposed surface, an electrically insulating support member in which said body, except for said surface, is embedded, a light-transmitting film of metal upon said surface, and an electrode in contact with said film, said electrode comprising a coating layer of low-resistance material disposed on a portion of the surface of said film.

2. A device according to claim 1 in which said support member is composed of a synthetic resinous material.

3. A device according to claim 1 in which said metal film is gold and is of a thickness such that it transmits about 30% of the incident light.

4. A device according to claim 3 in which said coating layer is a metal paste composed substantially of silver.

5. A device according to claim 1 in which said film is copper.

6. A device according to claim 1 in which said film is nickel.

7. An electrical device comprising a body of electrically insulating material having embedded therein a body of semi-conducting material, and a lead, said lead and said semi-conducting body each having a surface exposed at one face of said body of insulating material, a light transmitting film of metal covering said face and said exposed surfaces, and a low resistance coating upon said film between said surfaces and overlapping said surfaces.

8. A device according to claim 7 in which said lead is a wire.

9. A device according to claim 8 in which said lead is a cylindrical member concentrically surrounding said body of semi-conducting material.

10. An electrical device comprising a body of electrically insulating material having embedded therein a body of semi-conducting material having an etched surface exposed at one face of said insulating body, an electrode connected to another surface of said semi-conducting body, a lead embedded in said insulating material and having an exposed surface, a light transmitting film of metal covering both of said exposed surfaces, and a layer of metal paste upon said film between said exposed surfaces.

11. A device according to claim 10 in which said metal film is gold.

12. A device according to claim 11 in which said paste is silver paste.

13. A device according to claim 10 in which said metal film is copper.

14. A device according to claim 10 in which said metal film is nickel.

JACQUES I. PANTCHECHNIKOFF.

References Cited in the file of this patent

UNITED STATES PATENTS

| Number | Name | Date |
|---|---|---|
| 1,790,736 | Wald | Feb. 3, 1931 |
| 2,172,232 | Wilson | Sept. 5, 1939 |
| 2,196,830 | Hewlett | Apr. 9, 1940 |
| 2,331,444 | Wainer | Oct. 12, 1943 |
| 2,480,113 | Betzler | Aug. 30, 1949 |
| 2,496,432 | Blackburn | Feb. 7, 1950 |
| 2,504,627 | Benzer | Apr. 8, 1950 |
| 2,588,254 | Lark-Horovitz et al. | Mar. 4, 1952 |

Certificate of Correction

Patent No. 2,650,258 August 25, 1953

Jacques I. Pantchechnikoff

It is hereby certified that error appears in the printed specification of the above numbered patent requiring correction as follows:

Column 3, line 1, beginning with "The metal" and ending in line 7 with "lead 14." should read as shown below instead of as in the patent:

*The metal film may be deposited by well known vacuum evaporating techniques. Although not necessary to the operation of the device, the metal film 20 may be deposited upon the entire surface 10 of the insulator block, in which case it also covers the exposed face 16 of the cylindrical lead 14.*;

and that the said Letters Patent should be read as corrected above, so that the same may conform to the record of the case in the Patent Office.

Signed and sealed this 18th day of May, A. D. 1954.

[SEAL]

ARTHUR W. CROCKER,
*Assistant Commissioner of Patents.*